United States Patent [19]

Annapareddy et al.

[11] Patent Number: 5,602,839
[45] Date of Patent: Feb. 11, 1997

[54] ADAPTIVE AND DYNAMIC MESSAGE ROUTING SYSTEM FOR MULTINODE WORMHOLE NETWORKS

[75] Inventors: Narasimhareddy Annapareddy, College Station, Tex.; James T. Brady; Damon W. Finney, both of San Jose, Calif.

[73] Assignee: International Business Machines Corporation, Armonk, N.Y.

[21] Appl. No.: 555,539

[22] Filed: Nov. 9, 1995

[51] Int. Cl.$^6$ .......................... H04L 12/56; H04L 12/66
[52] U.S. Cl. ................................................ 370/405
[58] Field of Search ..................... 370/54, 58.2, 58.3, 370/60, 60.1, 85.13, 94.1, 94.2, 94.3, 85.14, 92

[56] References Cited

U.S. PATENT DOCUMENTS

| | | | |
|---|---|---|---|
| 5,079,767 | 1/1992 | Perlman | 370/94.3 |
| 5,142,531 | 8/1992 | Kirby | 370/94.3 |
| 5,206,856 | 4/1993 | Chung | 370/60 |
| 5,351,237 | 9/1994 | Shinobara et al. | 370/58.3 |
| 5,353,283 | 10/1994 | Tsuchiya | 370/60 |
| 5,365,520 | 11/1994 | Wang et al. | 370/60 |
| 5,495,479 | 2/1996 | Galaand et al. | 370/60 |
| 5,497,368 | 3/1996 | Reijnierse et al. | 370/54 |
| 5,519,705 | 5/1996 | Fukutomi | 370/85.13 |

FOREIGN PATENT DOCUMENTS 3626-870  2/1987  Germany ................ H04Q 3/47

OTHER PUBLICATIONS

R. Freitas et al., "Wavefront Routing", IBM Technical Disclosure Bulletin, vol. 36, No. 09B, Sep. 1993, pp. 183–184.

Primary Examiner—Hassan Kizou
Attorney, Agent, or Firm—Paik Saber

[57] ABSTRACT

In a multinode communication or multiprocessor network, messages are communicated from one node to another using an adaptive and dynamic routing scheme. The routing scheme includes two-level multi-path routing tables at each node to ensure efficient delivery of the messages. An entry in the level-1 table identifies a group of nodes and entry in the level-2 table identifies the address for each node within that group. The routing scheme also includes a deflection counter in each message header to avoid endless rerouting of messages and an exponential backoff and retry policy to avoid deadlocks.

24 Claims, 9 Drawing Sheets

| | PREFERRED DELIVERY DIRECTION FOR G1 | | | | |
|---|---|---|---|---|---|
| | 1 | 2 | 3 | 4 | 5 |
| G1 | — | — | — | — | — |
| G2 | G1.n4–G2.n1 | G1.n3–G2.n3 | G1.n3–G3.n3 | G1.n3–G4.n1 | G1.n1–G6.n2 |
| G3 | G1.n3–G3.n3 | G1.n3–G2.n3 | G1.n4–G2.n1 | G1.n3–G4.n1 | G1.n1–G6.n2 |
| G4 | G1.n3–G4.n1 | G1.n3–G3.n3 | G1.n4–G2.n1 | G1.n3–G2.n3 | G1.n1–G6.n2 |
| G5 | . . . | . . . | . . . | . . . | |
| G6 | . . . | . . . | . . . | . . . | |

FIG. 5

PREFERRED DELIVERY DIRECTIONS
FOR LOCAL NODE n1 OF G1

|    | 1     | 2     | 3     |
|----|-------|-------|-------|
| n1 | –     | –     | –     |
| n2 | n1–n2 | n1–n3 | n1–n4 |
| n3 | n1–n3 | n1–n4 | n1–n2 |
| n4 | n1–n4 | n1–n3 | n1–n2 |

FIG. 6

DELIVERY DIRECTIONS FOR n1 OF G1

|    | 1     | 2     | 3     |
|----|-------|-------|-------|
| n1 | –     | –     | –     |
| n2 | n1–n2 | n1–n4 | n1–n3 |
| n3 | n1–n3 | n1–n4 | n1–n2 |
| n4 | n1–n4 | n1–n2 | n1–n3 |

FIG. 11

PREFERRED DELIVERY DIRECTIONS FOR G1

800

| | 1 | 2 | 3 | 4 |
|---|---|---|---|---|
| G1 | – | – | – | – |
| G2 | G1-G2 | G1-G3 | G1-G4 | G1-G6 |
| G3 | G1-G3 | G1-G2 | G1-G4 | G1-G6 |
| G4 | G1-G4 | G1-G3 | G1-G2 | G1-G6 |
| G5 | . . . | . . . | . . . | . . . |
| G6 | . . . | . . . | . . . | . . . |

ADAPTIVE AND DYNAMIC MESSAGE ROUTING SYSTEM FOR MULTINODE WORMHOLE NETWORKS

BACKGROUND OF THE INVENTION

1. Technical Field

The present invention relates generally to delivering messages in communication or multiprocessor networks (generally referred to as networks). More particularly, the present invention relates to an adaptive and dynamic message routing system for delivering messages in wormhole networks using multiple level routing tables at each node of the network.

2. Description of the Background art

Communication networks that are generally used to interconnect computers or those used in telecommunication often comprise a number of nodes and communication links (links, routes) as shown in FIG. 1. Each node generally comprises a processor, one or more storage units and several I/O ports for connecting that node to the other nodes in the network. For example, in FIG. 1, node N1 may communicate to node N2 over communication link N1-N2 and node N3 may communicate to node N5 over communication link N3-N5. Each node in the network is generally capable of acting as a source, sink, and an intermediate node. Source node is a node where the message to be communicated is generated and transmitted from; sink destination) node is a node where the message generated by the source is to be communicated to (delivered to); and an intermediate node is a node between a source and a destination node encountered by the message in its route to the destination node. Furthermore, each message sent over the network generally comprises a message header and the information to be transmitted. The message header generally includes the address of the destination node where the message is supposed to be delivered and the address of the source node where the message was generated from.

As mentioned above, the network is generally utilized to deliver electronic messages among various nodes in the network. Furthermore, a majority of multinode communication networks have been arranged as either a "connection type" network, a "connectionless type" network or as a "wormhole" network.

In a connection type network, all of the data transfer takes place via a communication path which is completely established from a source node to a destination node by a message header before the message is transferred. In this type of network, the communication path established between the source node and destination node, including all the intermediate nodes and links, is held up and not released until the message has been completely delivered.

In a connectionless type network ("store and forward" network), a message is transferred from a source node to a destination node via packets (packets or datagrams refer to a message to be transmitted) where the packets are stored at each intermediate node until a connection is made to the next node (either intermediate or destination node) at which time the data is then transferred to that next node. Connectionless type networks require large buffer (memory) space at each node for storing and forwarding messages from one node to the next node in the network.

In wormhole networks, a message is transmitted from a source node to a destination node immediately after the message header has been transmitted thus avoiding storing and forwarding of the message at each intermediate node. By not storing and forwarding the message at each node, wormhole routing avoids using large memory buffers, and the delays associated with using these memory buffers, at each node of the network. This results in tremendous memory savings in the network as a whole.

Traditionally, wormhole routing techniques have relied on the network topology to route messages and to avoid deadlocks and bottlenecks. For example, E-cube routing routes messages in the order of dimensions in a hypercube network. Address-delta routing techniques route messages in X and then Y directions based on the difference between the address of the source and destination in a mesh network. Unfortunately, these routing techniques rely directly on the network topology and therefore, are not transferable from one network topology to another or vice versa. Also, in the past network topologies have imposed limits on the exact number of nodes in a network. For example, hypercube networks limit the number of nodes in the network to a power of 2 and a mesh network cannot support any prime number of nodes. Furthermore, as the number of nodes and links in a network increases, efficient message delivery and avoiding bottlenecks and preventing messages from endless travelling becomes an ever growing concern.

Therefore, there is a dire need for a message delivery and routing method and apparatus that is independent of a network topology (i.e., an adaptive method and apparatus); wherein the routing decisions are distributed among the nodes of the network (i.e., dynamic routing); and which at the same time can deliver messages in the shortest possible time using the minimum amount of network resources.

SUMMARY OF THE INVENTION

It is therefore an object of the present invention to provide a routing method and means for adaptively routing messages in a multinode network.

It is another object of the present invention to provide a routing method and means for dynamically routing messages in a multinode network.

It is a further object of the present invention to provide a routing method and means that is independent of network topology.

It is yet another object of the present invention to provide a routing method and means that distributes routing decisions among the nodes of the network.

It is a further object of the present invention to provide a routing method and means that minimizes the utilization of network resources for delivering messages.

It is a further object of the present invention to provide a routing method and means that minimizes the delays in delivering messages among the nodes of the network.

It is a further object of the present invention to provide a routing method and means that prevents messages from endless travelling (i.e., moving from one node to another node in the network without ever reaching the destination node) among the nodes of the network.

The above and other objects of the present invention are accordingly carried out by:

(1) dividing the nodes in a network into groups where each group comprises a plurality of nodes (referred to as local nodes) not included in any other group;

(2) identifying each node in the network by a local node address and a group address;

(3) storing in each message header the group address and local node address of the destination node;

(4) storing two routing tables at each node (level-1 and level-2 tables) where level-1 table provides message delivery directions (routing directions) from a node of a group to every other group in the network and level-2 table provides message delivery direction only among the local nodes of a group; and (5) routing a message from the source node to a destination node by using the two routing tables at each node in the network travelled by the message to determine the routing of the message from one node to another node to minimize delay and utilization of network resources in message delivery.

A level-1 table at each node n comprises multiple entries, one entry for each group in the network excluding the group that node n belongs to. Each entry provides multiple message delivery directions, including the most-preferred message delivery direction, for routing a given message from node n of a group to other groups in the network. Therefore, each node has a level-1 table with entries unique to that node. The message delivery directions in each entry are further ordered by the relative distance between the group identified by that entry and node n.

A level-2 table at each node n comprises multiple entries, each entry provides multiple message delivery directions, including the most-preferred message delivery direction, for routing a message from node n of group Gi to only other local nodes in group Gi. Therefore, each node n has a level-2 table with entries that are unique to that node. The message delivery directions in each entry are further ordered by the relative distance between the local node identified by that entry and node n.

Therefore, entries in the level-1 table provide means for communicating messages from a node of a group to another group adaptively and dynamically and the entries in the level-2 table allows the message delivered to the group to be routed to a specific local node within that group adaptively and dynamically.

In an alternative embodiment, the above and other objects of the present invention are carried out by:

(1) dividing the nodes in a network into gateway nodes and local nodes where each gateway node controls message delivery to a plurality of predetermined local nodes;

(2) identifying each local node in the network by a local node address and a gateway node address;

(3) storing in each message header the gateway node address and local node address of the destination node;

(4) storing a routing table at each gateway node (level-1 table) where level-1 table provides message delivery directions (routing directions) from a gateway node to every other gateway node in the network;

(5) storing a routing table at each local node (level-2 table) where level-2 table provides message delivery direction only among the local nodes controlled by a gateway node;

(6) routing a message from the source node to the destination gateway node by using the level-1 routing table at each gateway node in the network; and (7) routing the message among the local nodes of the destination gateway node using the level-2 table.

Note that a level-1 table at each gateway node Gn comprises multiple entries, one entry for every other gateway node in the network. Each entry provides multiple message delivery directions, including the most-preferred message delivery direction, for routing a given message from gateway node Gn to one other gateway node in the network. The entries are unique in each level-1 table. The message delivery directions in each entry are further ordered by the relative distance between the gateway identified by that entry and gateway node Gn.

A level-2 table at each local node n controlled by gateway node Gn comprises multiple entries, each entry provides multiple message delivery directions, including the most-preferred message delivery direction, for routing a message from node n to other local nodes controlled by gateway node Gn. The entries are unique in each level-2 table. The message delivery directions in each entry are further ordered by the relative distance between the local node identified by that entry and node n.

To further minimize network resources utilization, a deflection counter is also added to each message header where each time the message is routed from one node to another node or from one gateway to another gateway not using the most-preferred message delivery direction (the message is said to be deflected under such circumstances), the deflection counter is decremented by one count. If the deflection counter reaches zero and the message has not yet been delivered to its destination, the message delivery is terminated, the links acquired are released and the source is informed that the message could not be delivered. The message not delivered is referred to as "unsuccessfully terminated" or "unsuccessfully delivered" message. Use of a deflection counter in message headers prevents messages from endless traveling in the network without getting delivered to the destinations at all or in a predetermined number of deflections.

If the delivery of the message has been unsuccessful, after a brief period of time, the message delivery is retried for transmission from the source to the destination. For doing so, a backup and retry policy is implemented to guide the retry process. In the preferred embodiment of the present invention, exponential backup and retry process is carried out by a processor in each node. According to this process, the time separation for resending a message from a source node to a destination node is a function of $2^n$pt where n=1, 2, 3, . . . , 2n+1. Therefore, if a message sent by a source node at time t0 is not delivered successfully, it is resent 2pt time later. If the message sent at time t0+pt is also not delivered successfully, it may be resent 2pt time later. The exponential backup and retry process may be initiated by the processor controlling the source node as many times as necessary until the message is delivered to the destination node or a predetermined backup and retry limit is reached.

The multiple routing tables used at each node according to the present invention supports any network topology having any number of nodes thus avoiding the problem associated with fixed network topology. It further allows for efficient delivery of messages using two level addressing capability.

The routing system and method according to the present invention is adaptive because table entries can be changed if a node is added to or deleted from the network or if the node should be bypassed because of link failure. The routing system and method according to the present invention is also dynamic because delivery directions are controlled by each node in a path where several routes for delivering messages are provided at each node and any one of them can be utilized for delivering messages depending upon local conditions such as link availability.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a depiction of a level-1 table in accordance with the preferred embodiment of the present invention;

FIG. 6 is a depiction of a level-2 table in accordance with the preferred embodiment of the present invention;

FIG. 10 is a depiction of a level-1 table used in the embodiment of FIG. 8; and

FIG. 11 is a depiction of a level-2 table used in the embodiment of FIG. 8.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 1:
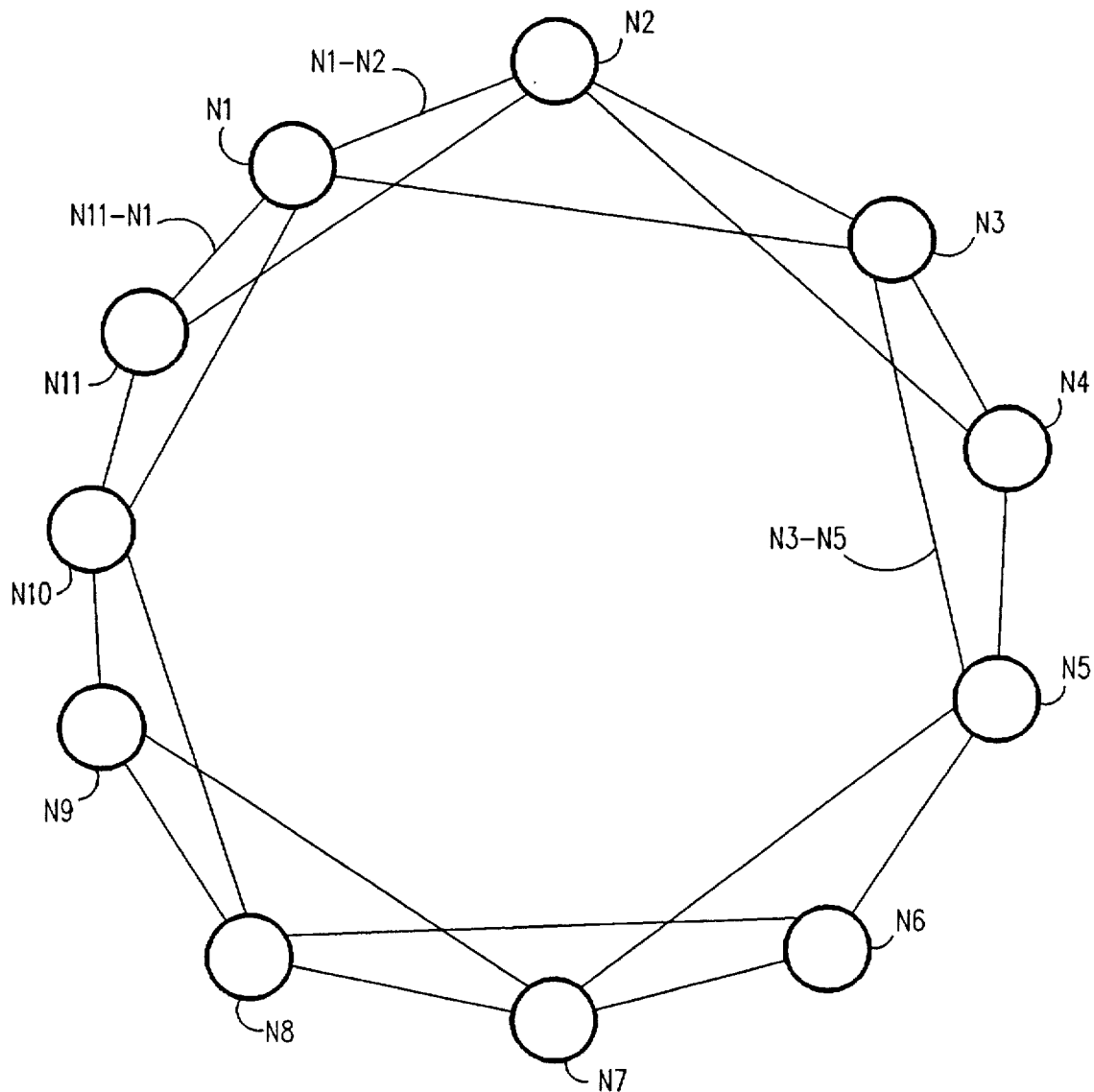
FIG. 1 is a depiction of a multinode network.
Figure 2:
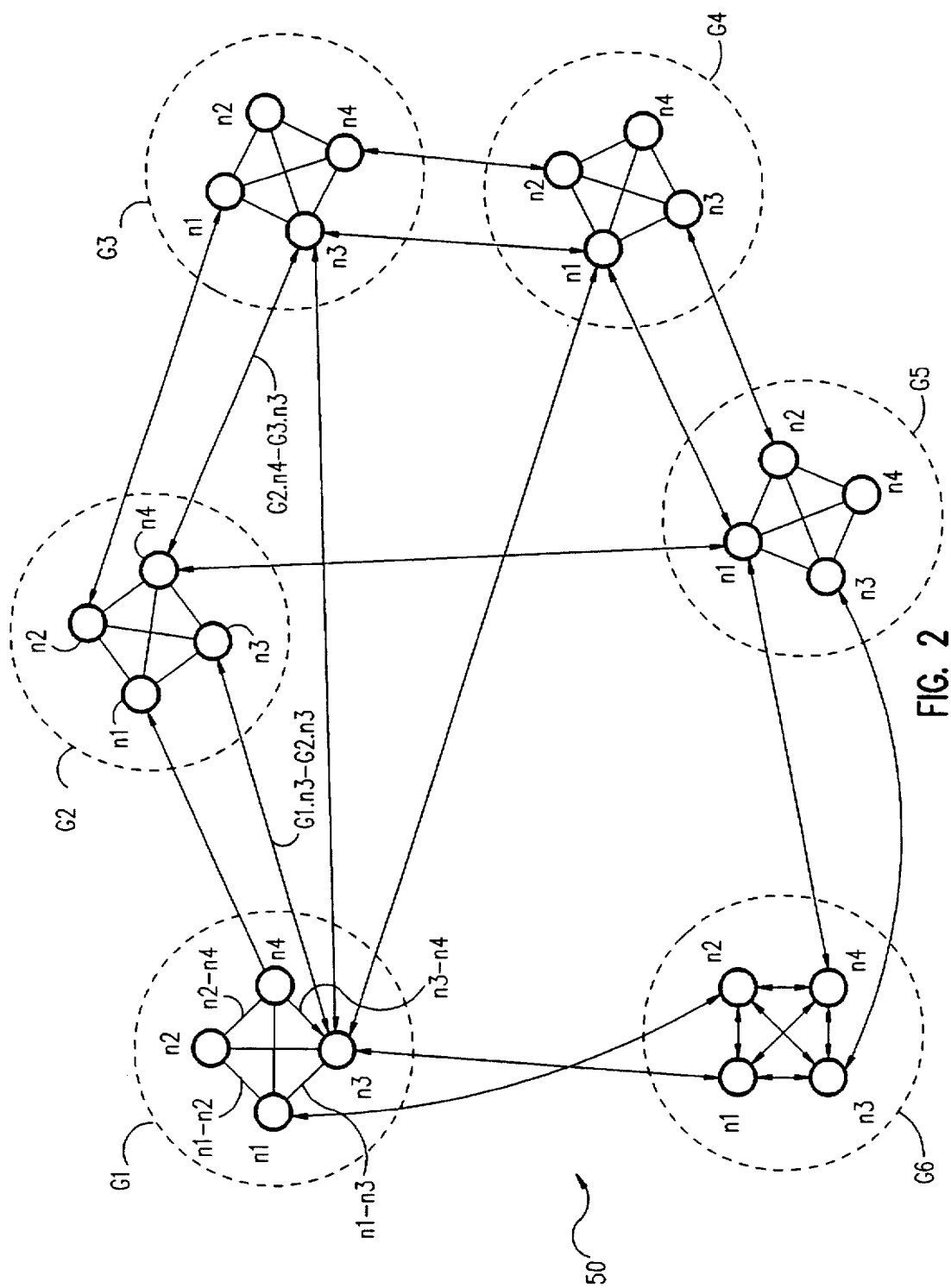
FIG. 2 is a depiction of a multinode network according to the preferred embodiment of the present invention.

Referring to FIG. 2, there is shown a depiction of a multinode network 50 according to the preferred embodiment of the present invention. The nodes in the network are divided into a plurality of groups, each group comprising at least one node referred to as a local node. The selection criteria for determining which local node should be assigned to which group may be made, for example, based on physical distance proximity among the nodes. In FIG. 2, symbols G1, G2, G3, . . . , and G6, signify group 1, group 2, group 3, . . . , and group 6, respectively. Each group is also shown to comprise, for illustration purposes only, four local nodes identified by symbols n1, n2, n3 and n4. Each group may have a different number of local nodes. Local nodes n1, n2, n3 and n4 of each group are identified at the group level by designation including a reference to the group they belong to and the local node itself. So, for example, node 1 of group 1 is identified by the symbol G1.n1 and node 3 of group 5 is identified by G5.n3. FIG. 2 further illustrates several links connecting one or more local nodes in each group to one or more local nodes of other groups. For example, group 1 is connected to group 2 via two links, one between node 4 of group 1 and node 1 of group 2 identified as G1.n4-G2.n1 and one link between node 3 of group 1 and node 3 of group 2 identified as G1.n3-G2.n3.

Figure 3:
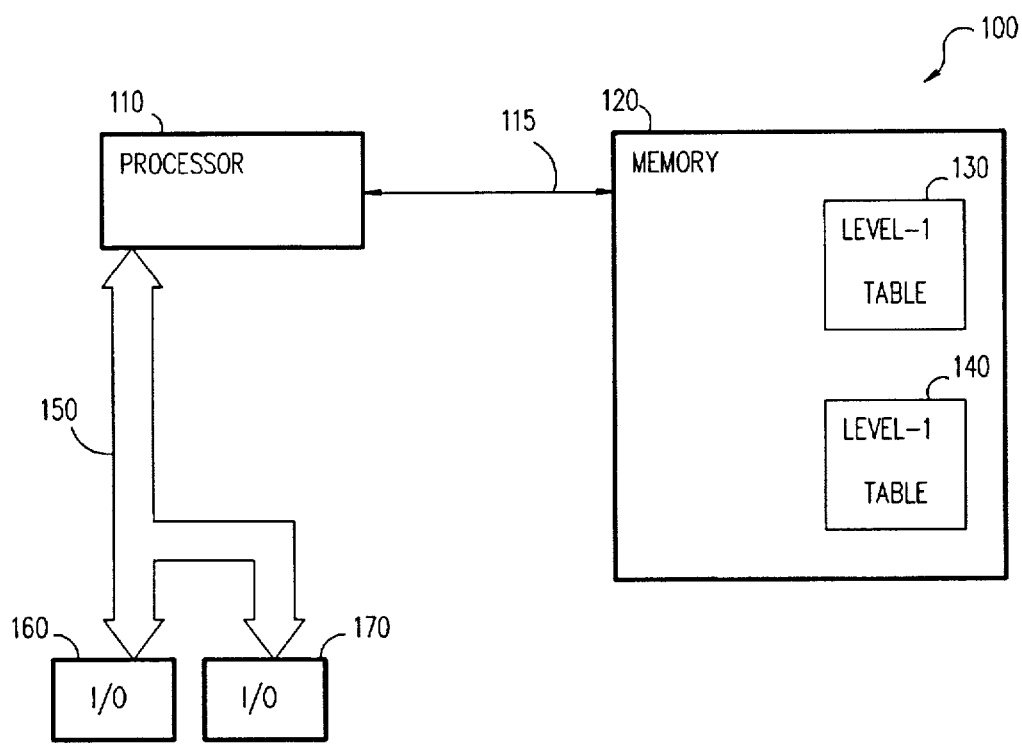
FIG. 3 is a depiction of a node according to the preferred embodiment of the present invention.

With respect to FIG. 3, there is shown a depiction of a typical local node 100 of network 50. Node 100 comprises a processor 110 in communication with memory (storage medium) 120 via link 115. Memory 120 which is preferably a semiconductor memory (DRAM, SRAM, NVRAM or alike) further comprises a level-1 table 130 and level-2 table 140. Level-1 table 130 comprises entries providing communication directions from node 100 to other groups in the network. Level-2 table 140 comprises entries providing message delivery directions among the local nodes of a group of which node 100 is one of the local nodes. Processor 110 is further connected to I/O channels 160 and 170 (two I/O channels are shown for illustration purposes only) via communication channel 150. I/O channels 160 and 170 provide means for communication between node 100 and predetermined nodes in network 50.

Figure 4:
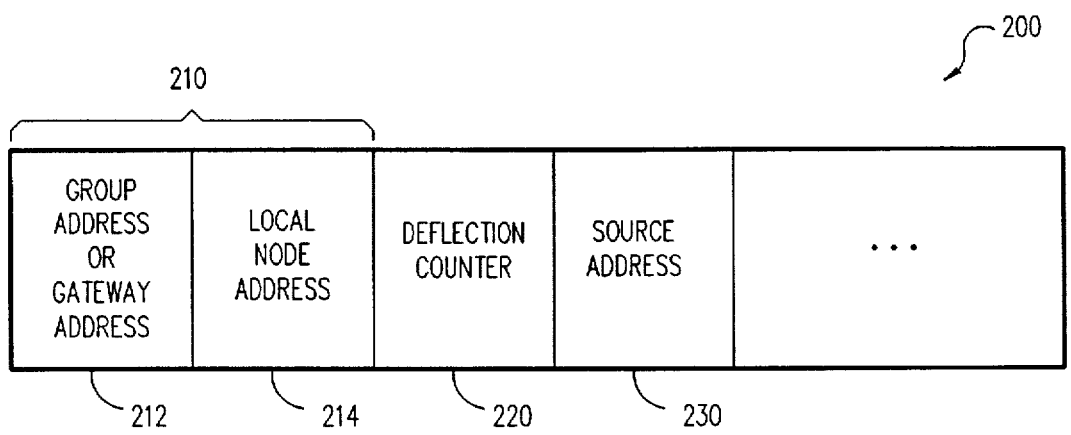
FIG. 4 is a depiction of a message header according to the preferred embodiment of the present invention.

With respect to FIG. 4, there is shown a depiction of a typical message header 200 of the present invention. Message header 200, which is typically several bytes long, comprises a destination address field 210, a deflection counter field 220, and a source address field 230. Destination address 210 further comprises a group (gateway) address field 212 and a local node address field 214. Group address 212 may be a byte or more long and a local node address 214 may be a byte or more long. In the present invention, group address 212 is used to route a message from a node of a source group (source group comprises the source node) to a destination group (destination group comprises the destination node). Once the message is delivered to the destination group, the local node address 214 is then used to route the message to the destination node. Each message routed in the network has a message header associated with it for, among other things, identifying the source node from which the message was sent from and the destination node to which the message should be delivered to.

Therefore, referring to FIGS. 2, 3 and 4, when processor 110 of node 100 receives a message header from another node in network 50, it first compares the group address 212 of the message header with node 100 group address. If they match each other (are equal), the message is delivered to node 100 for further processing in accordance with the content of local node address 214 and level-2 table 140. If group address 212 of the message header is not the same as (does not match) node 100 group address, then group address 212 is used as an index into level-1 table 130 to obtain possible message delivery directions along which the message may be forwarded toward its destination node from node 100.

With reference to FIG. 5, there is shown a depiction of a level-1 table 300 stored at memory locations of the nodes of group 1 (G1) in network 50 according to the present invention. Similar tables having different entries are also stored at nodes of the other groups in the network. Each row of table 300 stores an entry which is associated with a group in the network. Each entry comprises several sub-entries. The sub-entries in each row (five in this example for illustration purposes only) provide message delivery directions to the group associated with that row. For example, in table 300, row 320 is associated with group 2 (G2) and row 330 is associated with group 3 (G3). The sub-entries in row 320 provide message delivery directions for delivering messages from group 1 to group 2 and sub-entries in row 330 provide delivery directions for delivering messages from group 1 to group 3, respectively. The sub-entries in each row are further ordered from left to right from the most preferred message delivery route (direction) to the least preferred message delivery route from the current group to the group associated with that row. Thus, sub-entries in column 1 are the most preferred route for delivering messages from group 1 to other groups in the network, sub-entries in column 2 are the second most preferred routes for delivering messages from group 1 to other groups in the network, and sub-entries in column 5 are the east preferred message delivery routes for delivering messages from group 1 to other groups in the network.

For example, if a message is to be sent from a node in group 1 to a node in group 2 of network 50, where a node in group 2 is the destination, then according to sub-entries in row 320 of table 300, the shortest message delivery path is defined as G1.n4-G2.n1 (row 320 and column 1) which means there is a direct communication link between node 4 of group 1 and node 1 of group 2. If the link G1.n4-G2.n1 is busy or down due to failure, then the next sub-entry in row 320 (G1.n3-G2.n3) is selected as the path (route) to deliver the message from group 1 to group 2.

With reference to FIG. 6, there is shown a depiction of a level-2 table 400 of local node n1 of group G1 in network 50. Similar tables having different entries are also stored at the nodes of group G1 and the nodes of the other groups in the network. Each row of table 400 stores an entry which is associated with a local node of group G1. Each netry comprises several sub-entries. For example, row 420 is associated with local node 2 (n2) of G1 and row 430 is associated with local node 3 (n3) of G1. The sub-entries in each row (three in this example for illustration purposes only) provide delivery directions to the local node associated with that row. So sub-entries in row 420 of table 400 reflect the message delivery directions available for delivering messages from local node 1 to local node 2 of the group G1. The sub-entries in each row are further ordered from the most preferred delivering route to the least preferred delivering route from the current local node to the local node associated with that row. So sub-entries in column 1 are defined as the most preferred delivery routes from node 1 to local node 2, 3 and 4 of the group G1. Sub-entries in column 2 are defined as the second most preferred delivery route from n1 to other local nodes in the group G1. For example, if a message is sent from node 1 to node 2, then according to the sub-entries in row 420 and column 1 of table 400, the most preferred message delivery route is defined as n1-n2 which means there is a direct communication link between node 1 and node 2. If the link n1-n2 is unavailable, then the next sub-entry in row 420 is selected (n1-n3) as the path to deliver the message from node 1 to node 2. As stated earlier, the deflection counter in the message header is decremented by one every time the most-preferred message delivery route is unavailable for transmitting a message.

Figure 7:
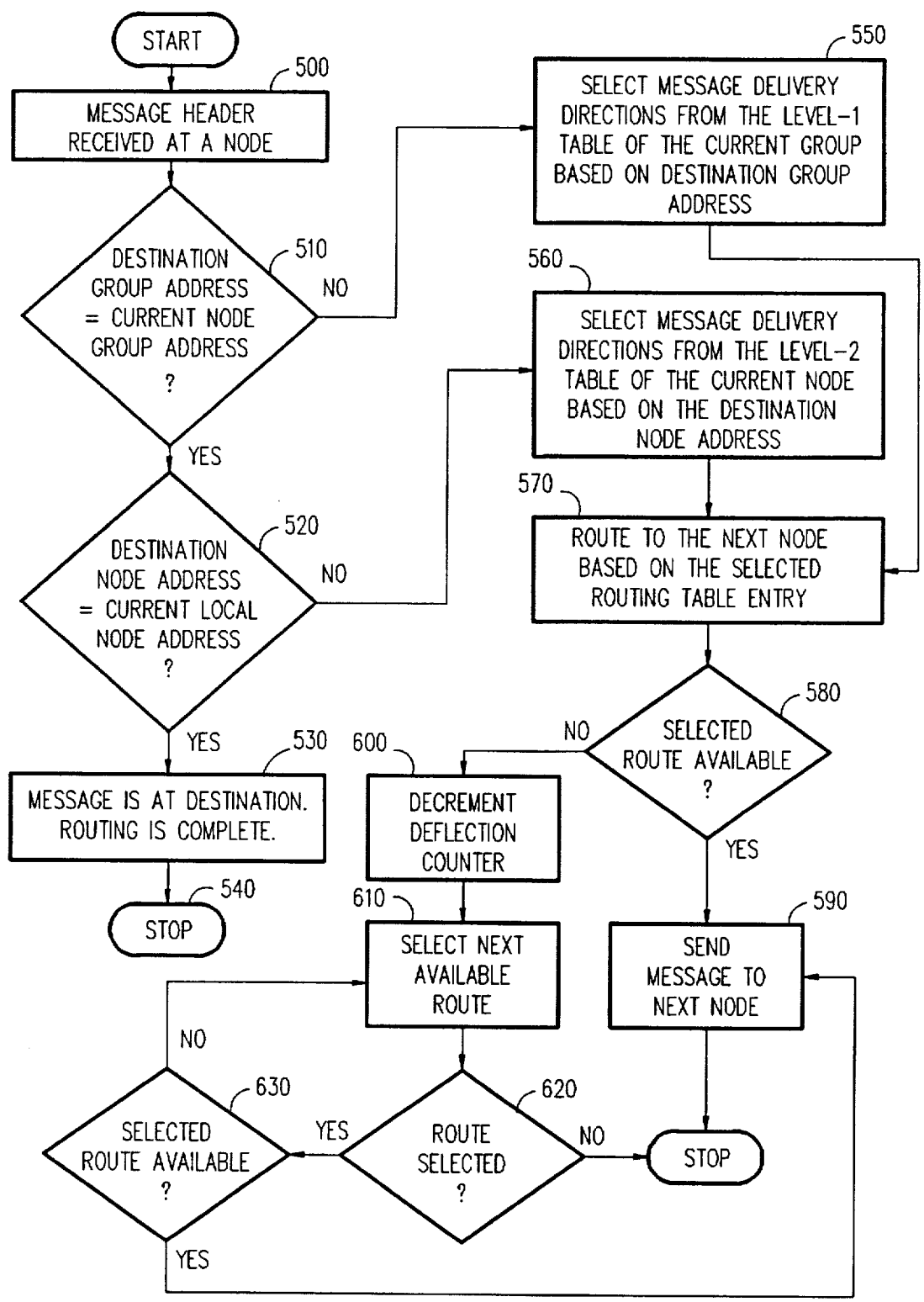
FIG. 7 is a flowchart of a message delivery according to the preferred embodiment of the present invention.

With reference to FIG. 7, there is shown a flowchart for delivering messages in a multinode network according to the preferred embodiment of the present invention. Referring generally to FIGS. 2 through 7, once message header 200 is received at node 100 (block 500) processor 110 compares the content of destination group address 212 in message header 210 with node 100 group address (block 510). If the content of destination group address 212 is the same as node 100 group address, processor 110 then compares the content of destination local node address 214 with node 100 local node address. (block 520). If they match each other (are the same), then the message has been received at its destination and routing is complete and message delivery has been successfully completed as shown by block 530. If the content of destination group address 212 is not the same as node 100 group address, then processor 110 selects message delivery directions from level-1 table 130 using the content of destination group address 212 (block 550) as an index to select an entry in level-1 table 130. The message delivery route selected from level-1 table 130 by processor 110 is then used to route the message to the next node where the next node could either be the destination node or another intermediate node (block 570). Processor 110 then checks to see whether the most preferred message delivery route (routes in column 1 of FIG. 5) selected from an entry in level-1 table 130 is available for message delivery (block 580). If the most preferred route is available, then the message is sent to the next node using that lost preferred route (block 590). However, if the most preferred route is unavailable, then deflection counter 220 in message header 200 is first decremented by one count (block 600). Processor 110 then selects the next alternate route that is listed in the routing table (block 610) and determines whether the selected route is available (block 620). If the selected route is available (block 630) the message is sent to the next node in the network (block 590). If none of the routes in the selected entry from level-1 table are available, then the message delivery operation is stopped, all the acquired links up to node 100 from the source node are released and a message is sent back to the source node stating that the message could not be delivered.

Referring back to block 520, if destination group address 212 is the same as node 100 group address, but destination local node address 214 is not the same as node 100 local node address, then processor 110 selects a message delivery direction from level-2 table 140 of node 100 using the content of destination local node address 214 as an index (block 560). The message is then routed to the next local node in the same group as node 100 based on the entry selected from the level-2 routing table (block 570). Again, if the most preferred route in the netry selected from level-2 table 140 by processor 110 is available, the message is delivered to the next local node using that route (block 590). If the most preferred route is not available, deflection counter 220 in the message header is decremented and further attempts are made to select alternate routes from the selected entry for delivering messages as shown by blocks 600, 610, 620 and 630.

Figure 8:
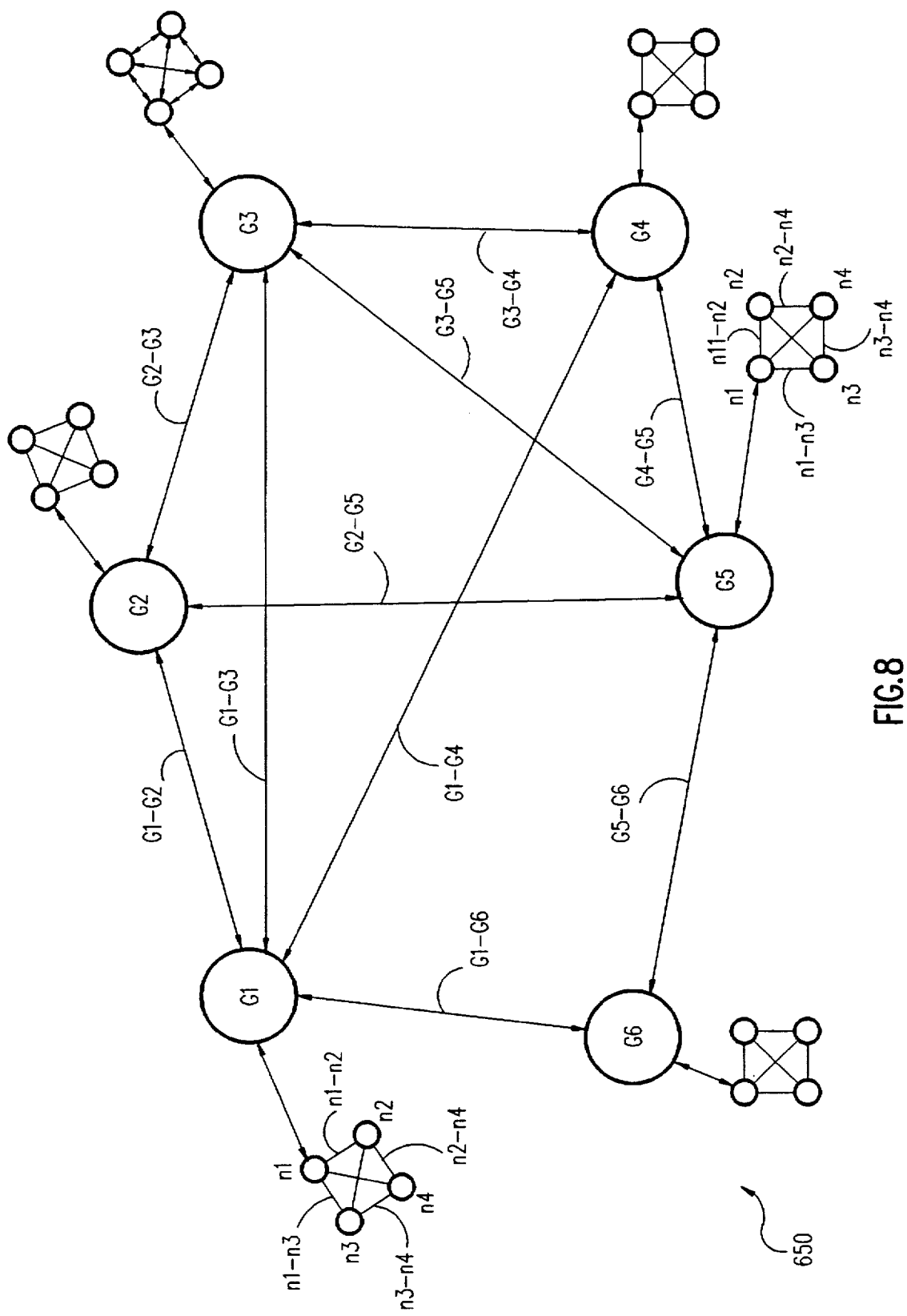
FIG. 8 is a depiction of a network according to an alternative embodiment of the present invention.

Referring now to FIG. 8, there is shown a depiction of a multinode network 650 according to an alternative embodiment of the present invention. The nodes in network 650 are divided into two sets designated as gateway nodes and local nodes. Each gateway node controls message delivery to a plurality of local nodes that are assigned to that gateway node. The selection criterion for determining which local nodes should be assigned to which gateway node is based on physical distance proximity among the nodes although other criteria may also be employed. In FIG. 8, nodes G1, G2, G3, . . . , and G6 are designated as gateway nodes. Furthermore, for the purpose of illustration only, four local nodes are shown to be assigned to each gateway node. Local nodes assigned to each gateway node are labeled as n1, n2, n3 and n4. At the gateway level, local nodes are identified by a designation comprising a reference to the gateway node and the associated local node. For example, local node n1 associated with gateway 1 is identified as G1.n1 and local node n3 associated with gateway 5 is identified as G5.n3. Gateway nodes are linked together via one or more communication links. For example, in FIG. 8, gateway node G1 is linked to G2, G3 and G4 via links G1-G2, G1-G3, and G1-G4, respectively, and gateway node G2 is linked to G1, G3, and G5 via communication links G1-G2, G2-G3, and G2-G5, respectively. Local nodes associated with each gateway node are also linked together via one or more communication links.

Figure 9:
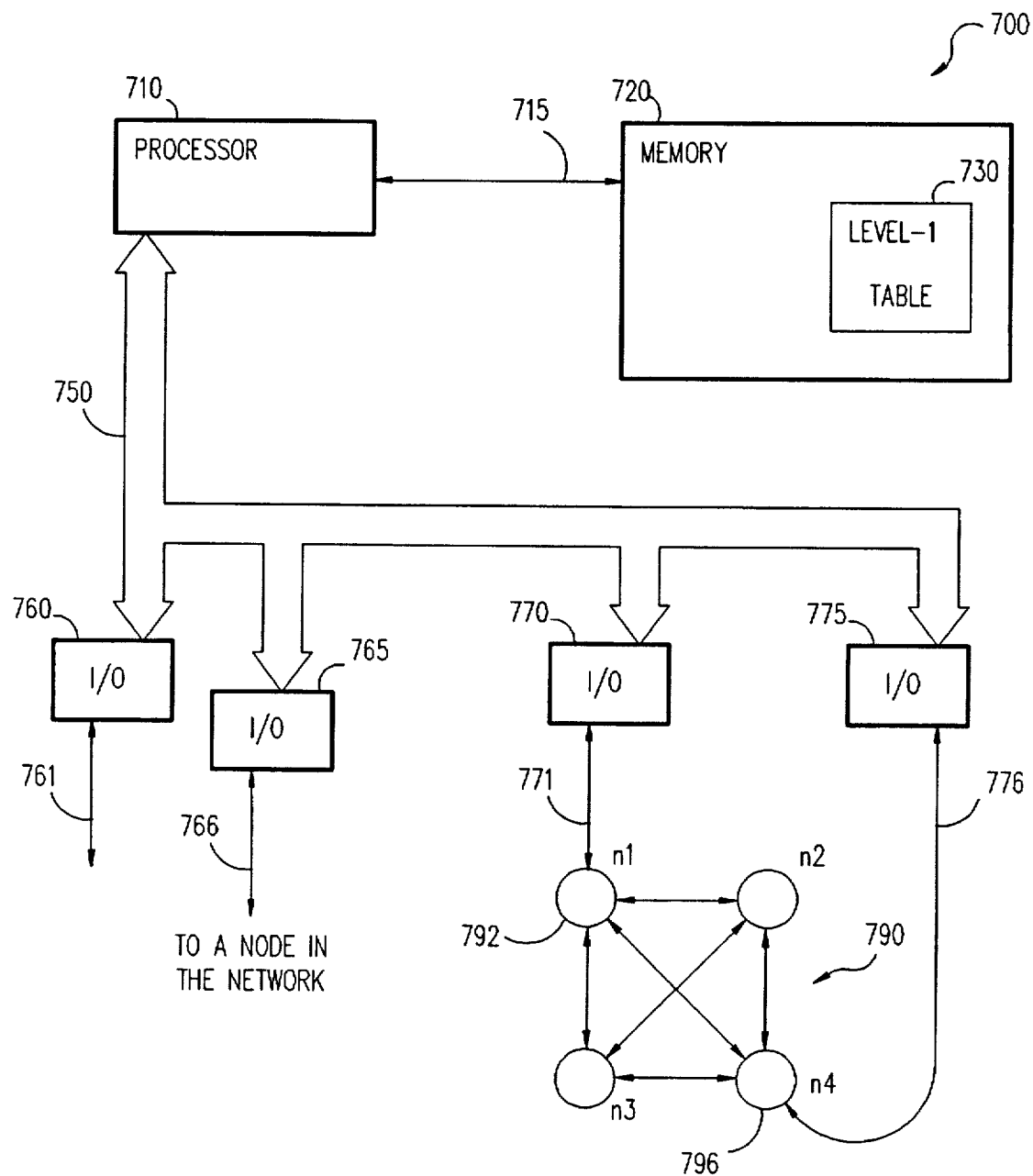
FIG. 9 is a depiction of a gateway node shown in FIG. 8.

With respect to FIG. 9, there is shown a depiction of a typical gateway node 700 and its local nodes 790 of multinode network 650. Referring to FIGS. 4, 8, and 9, gateway node 700 comprises a processor 710 in communication with memory 720 through link 715. Memory 720 further stores a level-1 table 730. Level-1 table 730 comprises entries providing message delivery directions from gateway node 700 to other gateway nodes in network 650. Processor 710 is further connected to several I/O channels through communication link 750. Four I/O channels 760, 765, 770, and 775 are shown for illustrative purposes. I/O channels 760 and 765 provide communication links to two other gateway nodes (not shown) in network 650 via links 761 and 766, respectively. I/O channels 770 and 775 provide communication links to local nodes 792 and 796 via links 771 and 776, respectively.

In this embodiment, processor 710 receives a message header 200 from another gateway node in the network through one of the I/O channels (760 or 765). Once processor 710 receives the message header, it compares destination gateway address 212 of message header 200 with the address of gateway node 700. If they are the same, the message is delivered to gateway node 700 and from there is directed to local nodes 790 for further delivery to one of the local nodes using the level-2 routing table stored at each local node. If the two addresses are not the same, the gateway address 212 is used as an index into level-1 routing table 730 to obtain message delivery directions along which the message may be forwarded from current gateway node 700 to its destination.

With reference to FIG. 10, there is shown a depiction of a level-1 table 800 associated with gateway node 1 shown in FIG. 8. A similar table with different entries is also stored at each other gateway node of network 650. Each row of table 800 stores an entry associated with a gateway node in network 650. Each entry in table 800 further comprises sub-entries. For example, in table 800, row 820 is associated with gateway node G2. The sub-entries in each row (four shown in this example) provide message delivery directions to the gateway node associated with that row. For example, sub-entries in row 820 provide message delivery directions for delivering messages from gateway node G1 to gateway node G2 in network 650. The sub-entries in each row are further ordered, from left to right, based on a predetermined criterion defining the most preferred routes for delivering a message from gateway node G1 to the gateway node associated with that row. So, for example, message delivery directions identified by row 820 and column 1 are the most preferred route for delivering messages from gateway node G1 to gateway node G2 in network 650. In general, sub-entries in column 1 are the most preferred message delivery routes from G1 to other gateway nodes in network 650. Sub-entries in column 2 are the second most preferred routes for delivering messages from gateway node G1 to other gateways in network 650. Therefore, if a message is sent from gateway node G1 to gateway node G2, then according to the sub-entries in row 820 and column 1, the most preferred message delivery path is defined as G1-G2 which provides a direct communication link between gateway node G1 and gateway node G2. If the direct communication link G1-G2 is unavailable because it is busy or it is down due to failure, then the next sub-entry identified by row 820 and column 2 is selected as the path to deliver the message from gateway node G1 to gateway node G2, which is identified as G1-G3. In other words, if the direct communication link between gateway node G1 and gateway node G2 is unavailable, then the message is sent from gateway node G1 to gateway node G3 and then an attempt is made to deliver the message from G3 to G2, the final destination. As mentioned before, if the most preferred route for delivering a message is unavailable, the deflection counter in the message header is decremented by a count before an attempt is made to deliver the message through an alternative route. This will ensure that a message is not routed endlessly (i.e., travelling the network from one node to anoth without ever reaching the destination node) in network 650.

With reference to FIG. 11, there is shown a depiction of a level-2 table 900 of local nodes n1, n2, n3, and n4 associated with gateway G1 of network 650 shown in FIG. 8. Each row of table 900 comprises an entry associated with one of the local nodes controlled by gateway node G1. Each entry in table 900 further comprises sub-entries. For example, row 920 is associated with local node n2. The sub-entries in row 920 (three in this example) provide message delivery directions to the local node associated with that row. For example, sub-entries in row 920 reflect the delivery directions available for delivering messages from local node n1 to local node n2. The sub-entries in each row are further ordered from left to right from the most preferred route to the least preferred route from the current local node to the local node associated with a given row. Therefore, the sub-entries in column 1 are defined as the most preferred delivery route from node 1 to any other local node in gateway node G1. Sub-entries in column 2 are defined as the second most preferred delivery route from node 1 to other local nodes in gateway node G1. For example, if a message is sent from node n1 to node n2, then according to the sub-entries in row 920, the most preferred message delivery route is defined as n1-n2 which provides a direct communication link between node n1 and node n2. If the link n1-n2 is unavailable for message delivery, then the next sub-entry in row 920 is selected (n1-n4) as the path to deliver the message from node n1 to node n2.

It can be readily appreciated by those skilled in the art that Applicants' invention of using two routing tables at each node having the combined g+n entries provides an adaptive and dynamic routing scheme in a network having g*n nodes. This is in contrast with the prior art or conventional practice of having a single table at each node, each table comprising g*n entries to support g*n nodes. Applicants' invention of using two routing tables at each node results in tremendous storage saving at each network node and provides a more efficient method of routing messages among the nodes of a network by utilizing small tables as opposed to extremely large tables. This results in faster delivery of messages and more efficient utilization of a network resources. Furthermore, Applicants' invention allows the routing decisions for each message to be made at local nodes in the network, based on local condition, thus providing dynamic routing capability. This is in contrast with routing methods wherein a predefined routing table is stored in a message header of a message or a predefined routing table is stored at each node of a network. Furthermore, the size of the level-1 table and level-2 table used at network nodes may be increased or decreased as the number of nodes in the network increases or decreases, respectively, thus providing an adaptive routing system and method.

A number of embodiments of the present invention have been described. Nevertheless, it will be understood that various modifications may be made without departing from the spirit and the scope of the invention. For example, instead of using four local nodes associated with each group or gateway node, a smaller or larger number of local nodes may be utilized. Or, instead of dividing the network nodes into local nodes and groups, each group comprising a predetermined number of local nodes, the network can be divided into three, four or even higher number of sets and by doing so, a higher number of tables may be utilized for delivering messages in the network. Or, instead of each node having its own processor and memory unit, it is possible that a plurality of the nodes may simply share (have access to) a processor and a storage medium. Accordingly, it is to be understood that the invention is not to be limited by the specific illustrated embodiments, but only by the scope of the appended claims.

We claim:

1. A wormhole network, comprising:
   a plurality of nodes interconnected by communication links, said nodes divided into groups where each of said groups includes a predetermined number of said nodes not included in the other groups, each node having a local node address and a group address and further having access to a processor and memory;
   each node including a level-1 table, said level-1 table comprising message delivery directions for delivering a message from a node of a group to another group in the network; and
   each node including a level-2 table, said level-2 table comprising message delivery directions for delivering said message from a node of a group to the other nodes within said group.

2. A wormhole network according to claim 1 wherein each of said message delivery directions in said level-1 table includes the most preferred message delivery direction for delivering a message from a node of a group to another group in the network.

3. A wormhole network according to claim 2 wherein said message delivery directions in said level-2 table include most preferred message delivery directions for delivering a message from a node of a group to the other nodes within said group.

4. A wormhole network according to claim 3 wherein said message comprises a message header, said message header including a destination address, said destination address having a destination group address and a destination local node address.

5. A wormhole network according to claim 4 wherein said destination group address is used as an index into a level-1 table of a node receiving said message to select a message delivery direction if said destination group address does not match the node group address.

6. A wormhole network according to claim 5 wherein said destination local node address is used as an index into a level-2 table of a node receiving said message to select a message delivery direction if said destination group address matches the node group address.

7. A wormhole network according to claim 6 wherein said message header further comprises a deflection counter, said deflection counter is decremented by a node receiving said message if the node is not the destination node and the most preferred message delivery direction for delivering the message in the level-1 table of said node is unavailable.

8. A wormhole network according to claim 7 further comprising a backup and retry means for resending an unsuccessfully terminated message.

9. A method of delivering messages in a wormhole network from a source node to a destination node where each message includes a group address and a local node address for the destination node, comprising the steps of:
   dividing nodes in said network into groups where each group comprises a plurality of the nodes not included in the other groups;
   storing a level-1 routing table at each node for providing message delivery directions from a node to every other group in the network;
   storing a level-2 routing table at each node for providing message delivery directions from a node of a group to the other nodes of said group; and
   routing said message from the source node to the destination node using the level-1 table and level-2 table.

10. A method of delivering messages in a wormhole network according to claim 9 wherein said message delivery directions in said level-1 table includes the most preferred message delivery directions for delivering a message from a node of a group to other groups in the network.

11. A method of delivering messages in a wormhole network according to claim 10 wherein said message delivery directions in said level-2 table includes the most preferred message delivery directions for delivering a message from a node of a group to the other nodes within said group.

12. A method of delivering messages in a wormhole network according to claim 11 wherein said message comprises a message header, said message header including a destination address, said destination address having a destination group address and a destination local node address.

13. A method of delivering messages in a wormhole network according to claim 12 wherein said destination group address is used as an index into a level-1 table of a node receiving said message if said destination group address does not match the node group address.

14. A method of delivering messages in a wormhole network according to claim 13 wherein said destination local node address is used as an index into a level-2 table of a node receiving said message if said destination group address matches the node group address.

15. A method of delivering messages in a wormhole network according to claim 14 wherein said message header further comprises a deflection counter, said deflection counter is decremented by a node receiving said message if the node is not the destination node and the most preferred message delivery direction in the level-1 table is unavailable.

16. A method of delivering messages in a wormhole network according to claim 15 further comprising a backoff-and-retry means for resending an unsuccessfully terminated message.

17. A wormhole network comprising:
   a plurality of nodes interconnected by communication links, said nodes divided into gateway nodes and local nodes where each of said gateway nodes controls message delivery to a predetermined number of said local nodes, each gateway node is identified by a gateway node address and each local node is identified by a local node address and a gateway node address, each of said nodes further having access to a processor and memory;
   a level-1 table stored at each gateway node, said level-1 table comprising message delivery directions, including the most preferred message delivery directions, for delivering a message from a gateway node to other gateway nodes in the network, said message comprising a message header, said message header including a destination address, said destination address having a destination gateway node address and a destination local node address;
   a level-2 table stored at each local node, said level-2 table comprising message delivery directions, including the most preferred message delivery directions, for delivering said message among the local nodes controlled by a gateway node; and
   wherein said destination gateway node address is used as an index into a level-1 table of a gateway node receiving said message if said destination gateway node address does not match the gateway node address of the gateway node receiving said message.

18. A wormhole network according to claim 17 wherein said destination local node address is used as an index into a level-2 table of a node receiving said message if said destination gateway node address matches the gateway node address of the gateway node receiving said message.

19. A wormhole network according to claim 18 wherein said message header further comprises a deflection counter, said deflection counter is decremented by a gateway node receiving said message if the gateway node is not the destination gateway node and the most preferred message delivery direction in the level-1 table is unavailable.

20. A wormhole network according to claim 19 further comprising a backup and retry means for resending an unsuccessfully terminated message.

21. A method of delivering messages in a wormhole network from a source node to a destination node where each message comprises a message header, said message header including a destination address, said destination address having a destination gateway node address and a destination local node address comprising the steps of:

- dividing nodes in said network into gateway nodes and local nodes where each gateway node controls message delivery to a predetermined number of local nodes;
- storing a level-1 routing table at each gateway node for providing message delivery directions, including the most preferred message delivery directions, from a gateway node to the other gateway nodes in the network:
- storing a level-2 routing table at each local node for providing message delivery directions, including the most preferred message delivery directions, from a local node of a gateway node to the other local nodes of said gateway node;
- routing said message from the source node to the destination gateway node using the level-1 table at each gateway node used in the network for message delivery;
- routing said message from the destination gateway node to the destination local node using the level-2 table at each local node used in the network for message delivery; and
- wherein said destination gateway address is used as an index into a level-1 table of a gateway node receiving said message if said destination gateway address does not match the gateway node address.

22. A method of delivering messages in a wormhole network according to claim 21 wherein said destination local node address is used as an index into a level-2 table of a local node receiving said message if said destination gateway address matches the gateway node address.

23. A method of delivering messages in a wormhole network according to claim 22 wherein said message header further comprises a deflection counter, said deflection counter is decremented by a node receiving said message if the node is not the destination node and the most preferred message delivery direction from that node to the next node is unavailable.

24. A method of delivering messages in a wormhole network according to claim 23 further comprising a backup and retry means for resending an unsuccessfully terminated message.

* * * * *